Patented Apr. 13, 1954

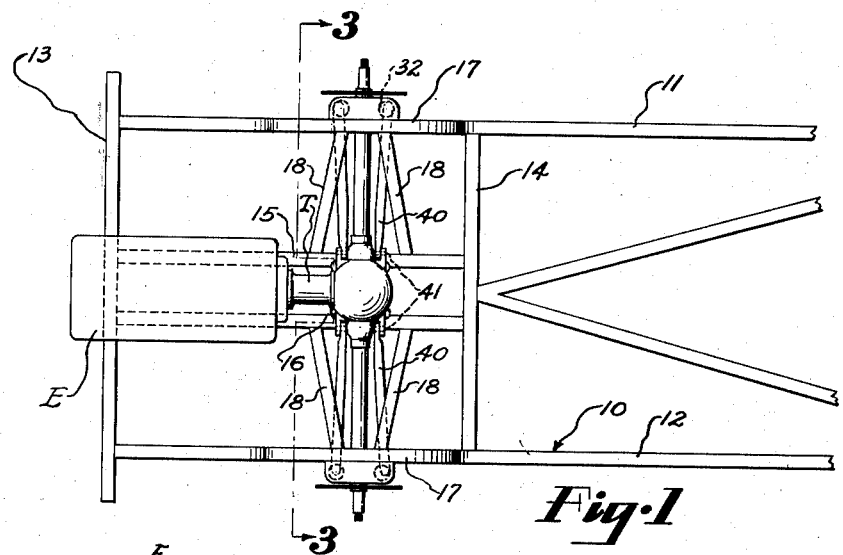
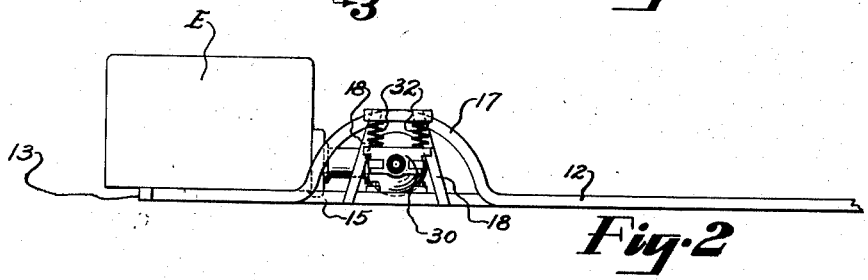
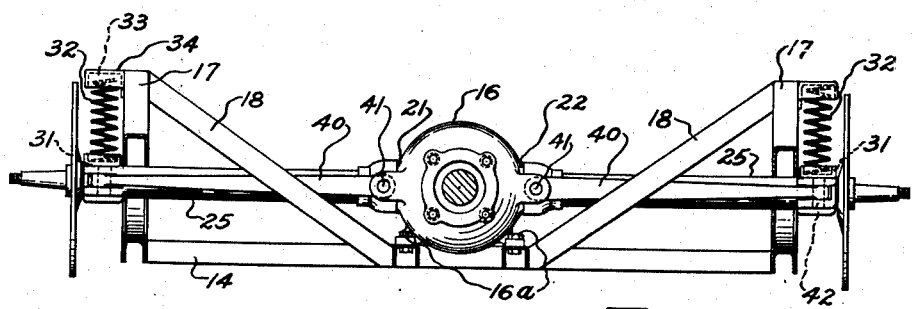
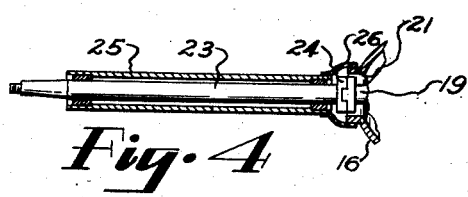

2,675,085

UNITED STATES PATENT OFFICE 2,675,085

DRIVING AXLE ASSEMBLY FOR LAND VEHICLES

Bronislaw J. Drozinski, Cleveland, Ohio

Substituted for application Serial No. 46,750, August 30, 1948. This application October 14, 1952, Serial No. 314,706

2 Claims. (Cl. 180—73)

The present invention relates to a driving axle assembly for automotive vehicles, such as trucks and automobiles.

The instant application is a substitute application for applicant's original forfeited application Serial No. 46,750, filed August 30, 1948.

An object of the invention is to provide a driving axle assembly for automotive vehicles which enables the output shaft of the gear transmission to be disposed adjacent to the differential gearing whereby the engine, clutch and transmission can be mounted on the same end of the vehicle as the differential and driving axles.

Another object of the invention is to provide a driving axle assembly for power driven vehicles which furnishes torque to driving wheels on opposite sides of the vehicle in such a manner that each driving wheel may move vertically relative to the chassis independently of the other wheel.

A further object of the invention is to provide a driving axle for automotive vehicles in which the differential gearing is attached directly to the chassis and the driving wheels are individually spring mounted to the chassis.

Other objects and advantages of the invention will be apparent from the following description of a preferred form of the invention, reference being made to the accompanying drawing wherein:

Fig. 1 is a fragmentary top view in elevation of a vehicle chassis with the engine and driving axle assembly mounted thereto;

Fig. 2 is a side view in elevation of the structure shown in Fig. 1;

Fig. 3 is a view in section taken on line 3—3 of Fig. 1; and

Fig. 4 is a longitudinal view in section of a driving axle and housing.

Heretofore the structure for driving axles for automotive vehicle axle assemblies consisted of a housing enclosing the differential and axle and which housing supported one end of the chassis by suitable springs. In traversing rough terrain the entire axle housing and differential would be affected by irregularities encountered by one or other wheels causing the differential to move vertically relative to the chassis. With this type of construction it was necessary to provide space for this vertical relative movement of the chassis and differential housing and it also constituted a substantial unsprung load on the wheels. Furthermore, since the engine and transmission were substantially fixed to the chassis some form of flexible drive connection was necessary to connect the transmission and differential.

In the present invention I propose to mount the differential and its housing directly to the chassis and provide means for permitting vertical movement of the drive wheels relative to the chassis and differential, the wheels supporting the chassis by springs. This construction permits a lowering of the center of gravity of the chassis by fixing the differential relative to the chassis thereby eliminating the usual vertical clearance, and it also relieves the wheels of considerable unsprung weight which reduces shocks on the driving gear and provides better riding qualities of the chassis. In addition, my structure permits the engine and transmission to be mounted adjacent to the differential gearing so that these elements constitute a power unit which can be mounted on one end of the chassis for driving the wheels at that end of the vehicle.

Referring now to the drawing, I have shown a chassis 10 for an automobile in which the engine and driving wheels are mounted at one end of the automobile, for example, the rear end. The chassis, which is not shown in its entirety, comprises two longitudinal outer members 11 and 12 interconnected by two cross members 13 and 14. A pair of channel members 15 are connected between cross members 13 and 14 for supporting the engine E and transmission T and the differential housing 16. The engine and transmission are connected to the chassis by suitable bolts, not shown, and the differential housing is firmly secured to the chassis by bolts 16a which attach the housing to members 15. Preferably, the transmission housing is connected to the differential housing so that the length of the connecting shaft between the transmission and differential is negligible. The longitudinal members 11 and 12 are arched at 17 to form a freeway for vertical movement of the axles at the wheels, to be described hereinafter. A pair of bars 18 are mounted between the members 15 and the frame members 11 and 12, respectively, at the portions 17 to lend lateral support to these parts of the frame.

The axle assembly comprises the differential housing 16 in which the usual differential gearing is mounted, the output shafts 19 of which differential gearing, only one of which is shown, extend through journal portions 21 and 22 on opposite sides of the housing. Each of the output shafts is connected to an axle member 23, only one of which is shown, through universal joints 24. Each of the axles 23 are adapted to carry a driving wheel of the vehicle, not shown, and each axle is enclosed in a tubular housing 25, which housing terminates short of the universal joint connection 24. A flexible sleeve 26 is secured intermediate the differential housing and the inner end of the housing 25 to exclude dirt from and to retain lubricant in the housings. The flexible sleeves permit the housings 25 and axles therein to swing as a unit more or less freely in a vertical arc about an axis at the end of the output shafts of the differential gearing.

The outer ends of the housings 25 extend below arch portions 17 of the frame and they are provided with spring brackets 30 which provide seats 31 for receiving two coil springs 32. The upper ends of the springs 32 are received in similar seats 33 formed in brackets 34 attached to and extending laterally from the arches 17 of the chassis frame. Thus, it will be seen that the chassis is supported by the drive wheels through the medium of the housings 25, but the housings and wheels may move vertically to the chassis independently of the differential housing 16 which is attached to the central portion of the chassis.

Movement of each of the housings 25 in an arc in the horizontal plane is prevented by two braces 40, one end of which braces are pivotally attached to the differential housing 16 by studs 41 and the opposite ends of which are attached to the brackets 30 by pins 42. The inner ends of the braces are pivoted on substantially the same axis as the universal joints 24 so that the braces may swing in a vertical arc corresponding to that of the axle housing 25.

Although in the form of the invention disclosed I have shown the engine mounted adjacent to the differential, as would be the case of a rear engine drive automobile or a front drive automobile with the engine in the front, it will be apparent that the invention could be used with the engine at the opposite end of the chassis.

Another advantage in providing for individual vertical movements of the drive axles is that greater stability is afforded the vehicle in rounding curves in that during any tipping of the vehicle the wheel bearing the load will remain in a vertical plane rather than tilting as in previous constructions employing a rigid axle structure.

Although I have described but one form of the invention, it will be apparent that other forms of the invention might be adopted, all falling within the scope of the claims which follow.

I claim:

1. In a road vehicle having a chassis and running gear, a rigid frame comprising drop type side frame bars, transversely extending cross-supports secured to said side frame bars, centrally disposed longitudinally extending channel members secured to said cross-supports and truss members interconnecting said channel members and said side frame bars, said truss members extending upwardly and angularly from the channel members to the high point of drop frame bars, a pair of driving axles and housings therefor, differential gearing and housing for said axles fixedly mounted on said channel members and between said cross-supports and being disposed thereon below the high point of said drop frame bars, universal joints interconnecting the differential and axles whereby the axles may move vertically relative to the differential, a pair of braces disposed on opposite sides of each driving axle and in the same horizontal plane therewith, said braces being pivotally attached to the differential housing closely adjacent the said universal joints and being attached to the axle housings adjacent the side frame bars, and spring means between the axles and side frame bars for resiliently supporting the chassis on the axles.

2. In a road vehicle having a chassis and running gear as characterized in claim 1, the braces being pivotally attached to the differential housing on an axis substantially coinciding with the axes of the universal joints.

References Cited in the file of this patent

UNITED STATES PATENTS

| Number | Name | Date |
|---|---|---|
| 1,903,694 | Burney | Apr. 11, 1933 |
| 2,012,202 | Pavlack | Aug. 20, 1935 |
| 2,047,336 | Stout | July 14, 1936 |
| 2,145,670 | Tjaarda | Jan. 31, 1939 |
| 2,199,517 | Best | May 7, 1940 |
| 2,219,828 | Steinmann | Oct. 29, 1940 |
| 2,330,541 | Barenyi | Sept. 28, 1943 |
| 2,344,380 | Wilfert et al. | Mar. 14, 1944 |

FOREIGN PATENTS

| Number | Country | Date |
|---|---|---|
| 853,228 | France | Nov. 28, 1939 |